June 16, 1964

A. R. BIEDESS 3,137,360

STABILIZED MOUNTING FOR DRIVEN STEERED
WHEELS OF ROCK LOADING MACHINES

Filed Feb. 18, 1960

INVENTOR.
Anthony R. Biedess
BY
ATTYS.

INVENTOR.
Anthony R. Biedess

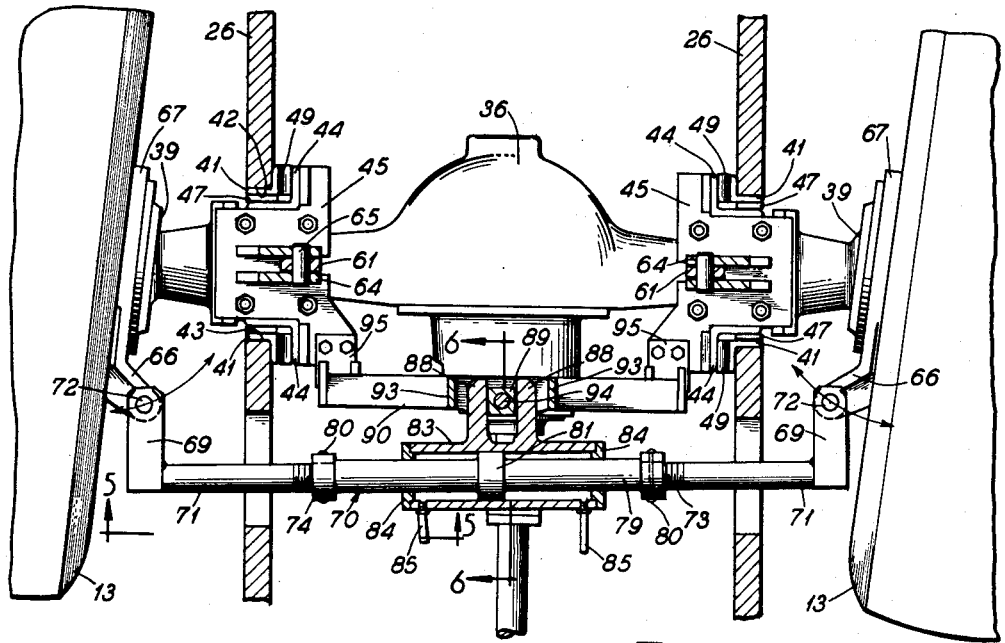
Fig. 4
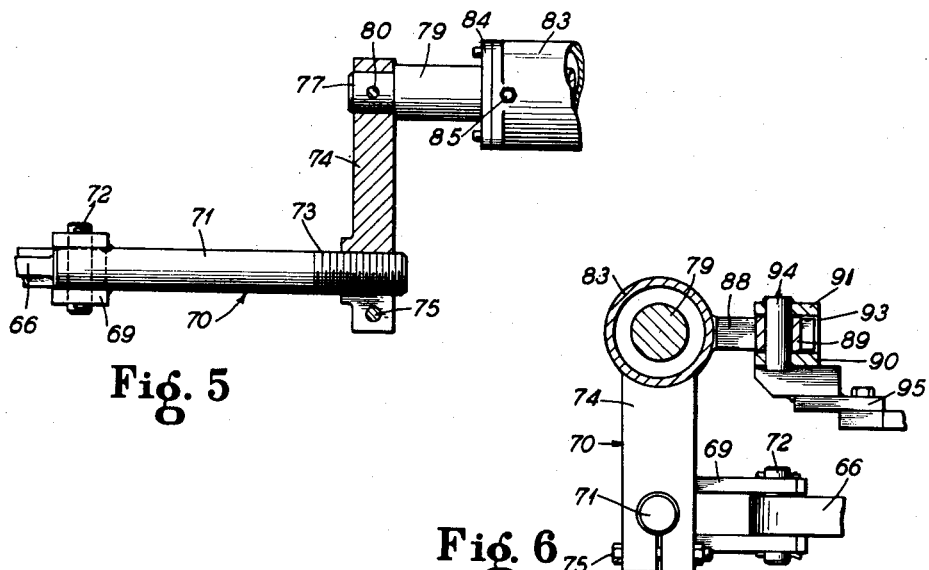
Fig. 5
Fig. 6
INVENTOR.
Anthony R. Biedess
BY
ATTYS.

United States Patent Office 3,137,360
Patented June 16, 1964

3,137,360
STABILIZED MOUNTING FOR DRIVEN STEERED WHEELS OF ROCK LOADING MACHINES
Anthony R. Biedess, Chicago, Ill., assignor to Goodman Manufacturing Company, Chicago, Ill., a corporation of Illinois
Filed Feb. 18, 1960, Ser. No. 9,501
2 Claims. (Cl. 180—44)

This invention relates to improvements in rock loading machines and more particularly relates to an improved suspension and power steering means therefor.

A principal object of the invention is to improve upon the suspension of rock loading machines and the like with a view toward increasing the stability of the machine both during tramming and loading.

A further object of the invention is to provide a rock loading machine of a novel and improved construction in which the stability of the machine is increased and steering is facilitated by supporting the frame of the machine on rigid and movable axles, by mounting the steering wheels on the movable axle and by connecting the means for turning the steering wheels for steering, with the movable axle to tilt therewith.

A still further object of the invention is to provide an improved form of rock loading machine having an inclined elevating conveyor extending in advance of the front wheels of the machine having a digger bucket supported thereon and extending in advance thereof, in which the load on the machine frame is maintained in centered relation with respect to the main frame of the machine by a transversely movable equalizing bar supporting one end of the machine on an axle housing for one pair of wheels.

Still another object of the invention is to provide a novel and improved form of rock loading machine having steering wheels and an angularly movable transverse support for the steering wheels, in which steering is improved and steering stresses are reduced by an improved form of power steering mechanism guided for angular movement with the support for the steering wheels.

These and other objects of the invention will appear from time to time as the following specification proceeds and with reference to the accompanying drawings wherein:

FIGURE 4 is an enlarged fragmentary plan view of the rear axle housing and steering wheels, with certain parts broken away and certain other parts shown in horizontal section;

FIGURE 5 is a fragmentary side view of parts of the steering tie rod assembly, looking substantially along line 5—5 of FIGURE 4, and showing certain parts in vertical section; and FIGURE 6 is an enlarged fragmentary sectional view taken substantially along line 6—6 of FIGURE 4, showing certain details of the steering mechanism and the connection of the steering cylinder to the rear axle housing.

Figure 1:
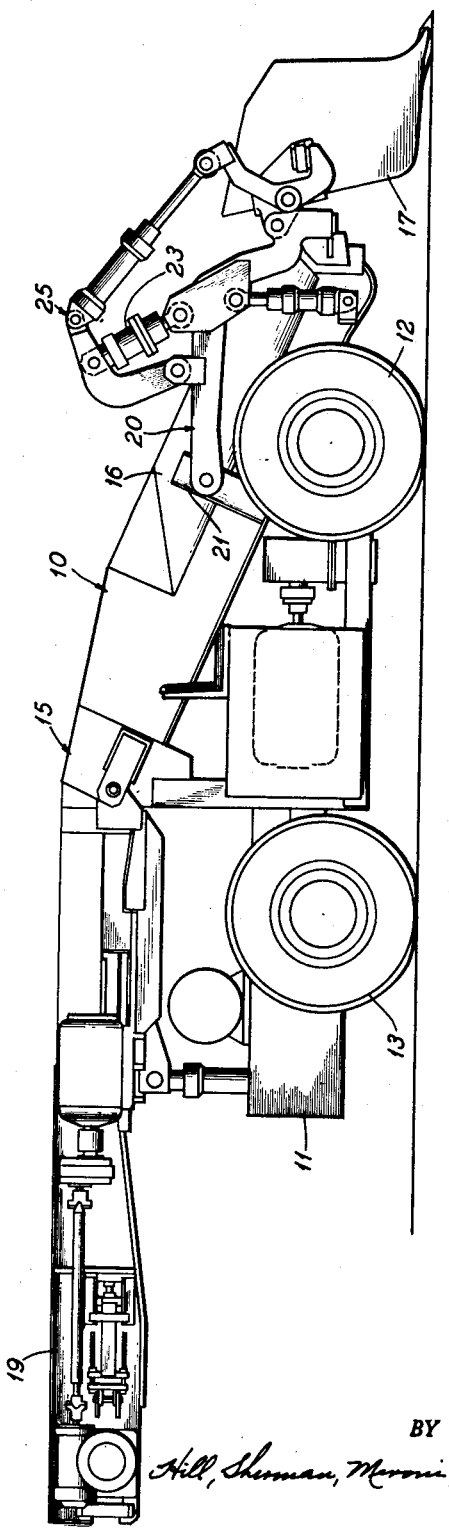
FIGURE 1 is a view in side elevation of a rock loading machine constructed in accordance with the invention.

In the embodiment of the invention illustrated in the drawings, I have shown in FIGURE 1 a rock loading machine 10 of a type operable underground in mines, to load rock from the working face of a tunnel and the like.

The rock loading machine 10, as shown herein, includes a main frame 11 mounted on front drive wheels 12 and rear steering and drive wheels 13.

A conveyor 15 extends along the main frame 11 from in advance of the forward end thereof to a position rearwardly of the rear end thereof and has an inclined elevating portion 16 having a digger bucket 17 supported on the forward end thereof and extending in advance thereof. The conveyor 15 also has a rear laterally movable discharge portion 19, extending rearwardly of the main frame 11 and mounted thereon for lateral and vertical adjustable movement with respect to the inclined elevating portion 16 of the conveyor.

The digger bucket 17 is shown in FIGURE 1 as being pivotally mounted to the forward end of a boom 20 extending along opposite sides of the inclined elevating portion 16, of the conveyor 15 and pivotally mounted on the main frame 11 on upright brackets 21, spaced rearwardly of the forward end of the inclined elevating portion 16 of the conveyor 15 on opposite sides thereof. The digger bucket 17 is elevated to a discharge position by operation of hydraulic jacks 23 pivotally connected between the boom 20 and link and leverage connections 25, operatively connected with the digger bucket 17. The boom 20, the hydraulic jacks 23 and link and leverage connections 25 for pivoting the digger bucket upwardly to discharge its load onto the inclined elevating portion 16 of the conveyor 15 are no part of the present invention, except insofar as the digger bucket 17, supported in advance of the machine, tends to disturb the balance of the machine when the front wheels are on irregular ground and one wheel is higher than the other. The digger bucket 17 and the support and operating mechanism for said digger bucket, therefore, need not herein be shown or described further.

Referring now in particular to the support for the main frame 11 on the front drive wheels 12 and the rear drive and steering wheels 13, the main frame 11 includes parallel spaced side frame structures 26 extending for substantially the length thereof and having a differential and axle housing 27 extending across the front end portion thereof and fixedly mounted thereon. The differential and axle housing 27 serves as a housing for the support and drive axles (not shown) for the front wheels 12 and may house a locking or limited torque type of differential (not shown) driven from suitable gearing (not shown), housed within a gear box 29, through a coupling 30.

Two laterally spaced motors 31 are provided to individually drive the front and rear wheels through gearing (not shown) within the gear housing 29 through couplings 32. The gearing within the gear housing 29 may be individual trains of reduction gearing for the front and rear wheels, which serve to drive the coupling 30 for driving the front wheels 12, and a universal coupling 33 for driving the rear wheels 13 through an extensible drive shaft 35. The individual motors 31 driving the front and rear wheels thus provide electric differentials between the front and rear wheels to accommodate for rough bottom and variations in grade.

The extensible drive shaft 35 serves to drive differential gearing (not shown) housed in a differential and axle housing 36 through a universal coupling 37 in a conventional manner. The differential and axle housing 36 houses the drive axles (not shown) for driving the rear steering wheels 13 through the differential gearing (not shown) housed within said housing and through conventional universal or ball type supports and drive couplings, indicated generally by reference characters 39, supporting the rear wheels for steering, and driving the rear wheels during the operation of steering.

The differential and axle housing 36 is slidably guided adjacent its opposite ends along longitudinally spaced vertically extending angles 41, shown in FIGURE 4 as extending along opposite sides 42 of open portions 43 of the side frame structures 26 and having their right angled legs extending vertically along the insides of said side frame structures.

As shown in FIGURE 4, vertically extending angles 44 are recessed within upper and lower plates 45 and 46 extending along the upper and lower sides of the differential and axle housing 36 and suitably secured thereto. The angles 44 face the angles 41 and have bearing strips 47 extending along their outwardly extending legs, slidably engaging the legs of the angles 41 extending along the walls 42 of the open portion 43. The other legs of the angles 44 have bearing strips 49 extending therealong having arcuate bearing faces 50 (FIGURE 3) slidably engaging the legs of the angles 41 extending along the insides of the frame structures 26. The arcuate bearing faces 50 of the bearing plates 49 may thus rock about the inner vertical legs of the angles 41 upon transverse rocking movement of the differential and axle housing 36, as when one wheel encounters a bump on the roadway, as shown in FIGURE 3.

Figure 2:
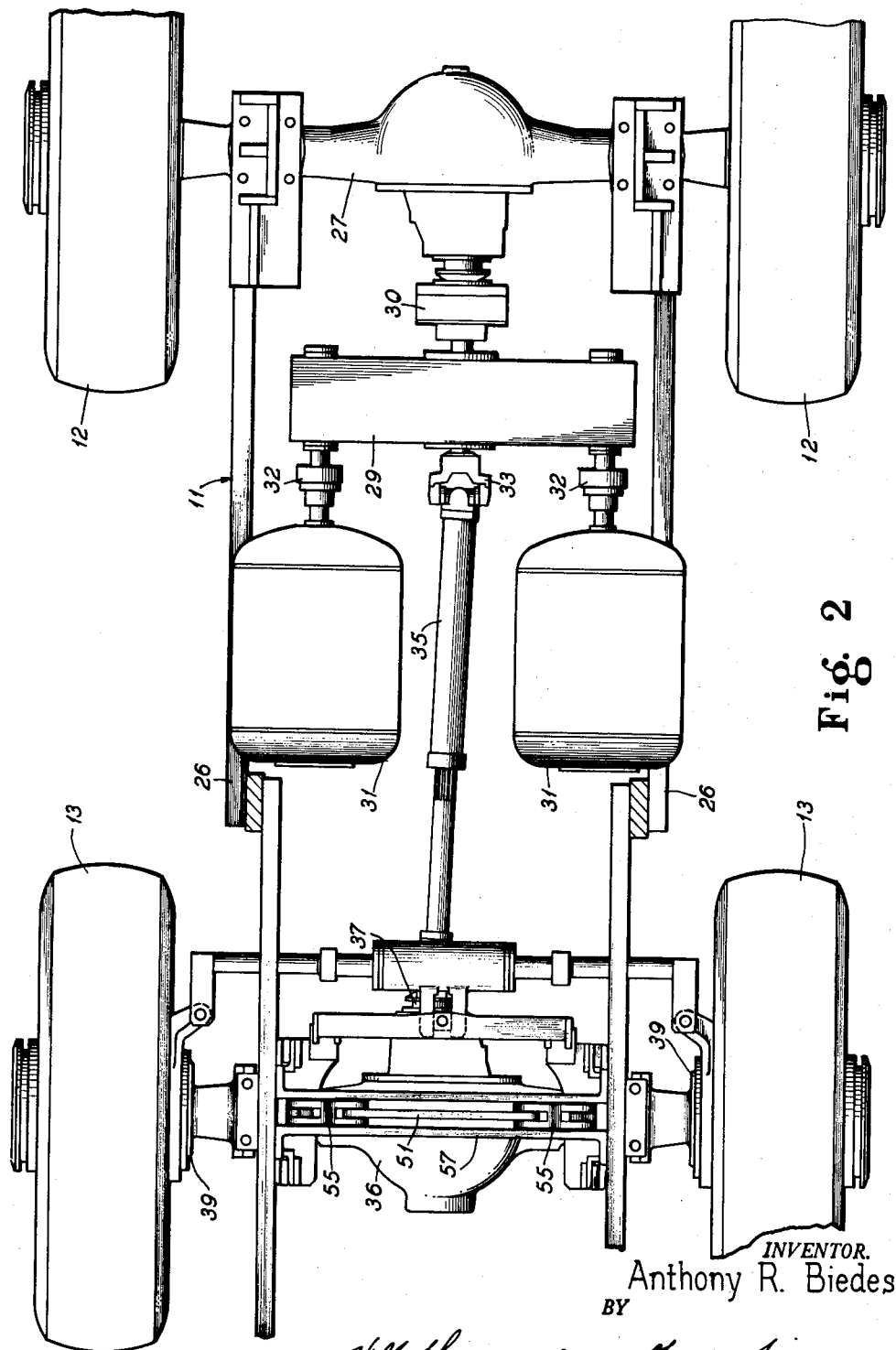
FIGURE 2 is a fragmentary plan view of the machine shown in FIGURE 1, with the conveyors and dipper bucket removed, in order to show the drive to the front and rear wheels of the machine and the suspension of the machine on the axle housings, as well as the hydraulic steering mechanism for the steering wheels.
Figure 3:
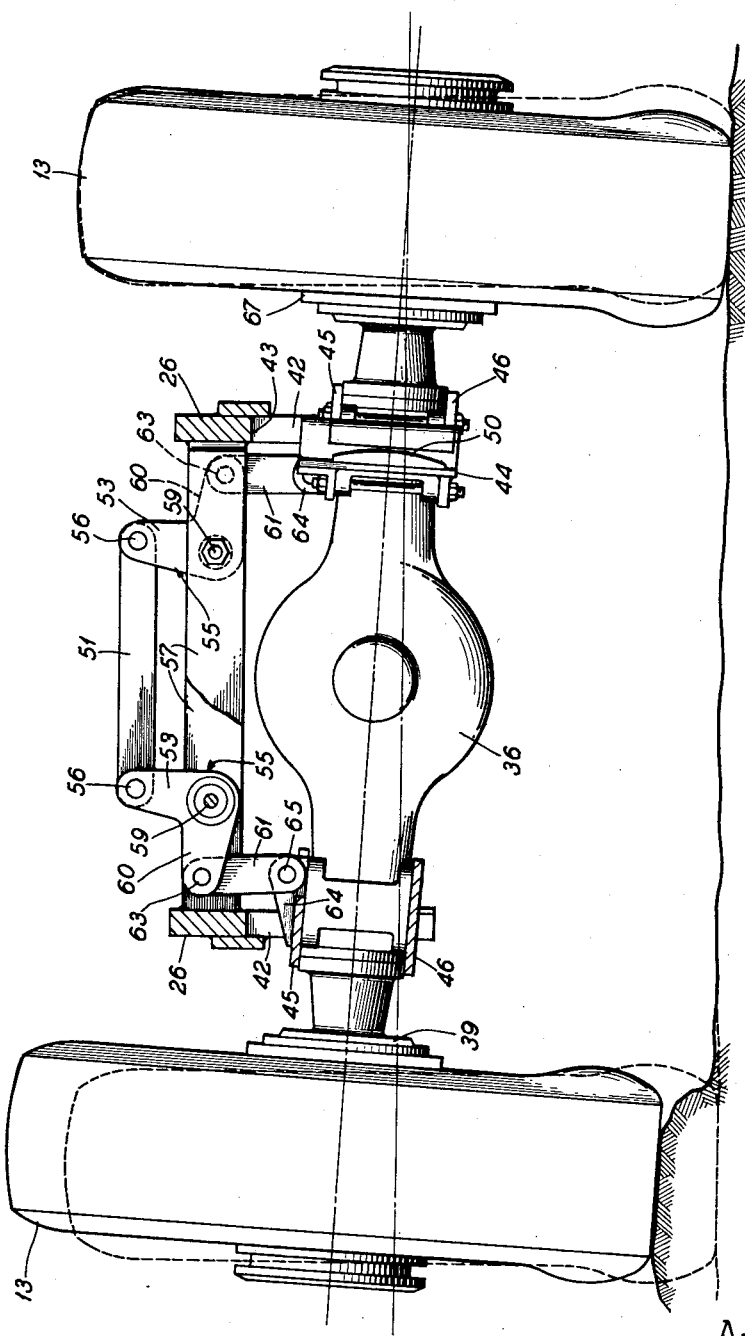
FIGURE 3 is a fragmentary horizontal sectional view of the rear end portion of the machine taken through the steering mechanism and suspension for the frame on the rear axle housing.

The support for the frame 11 on the rear differential and axle housing 36 is shown in FIGURES 2 and 3 as comprising a transverse equalizing bar 51 extending through the bifurcated upper end portions of upright lever arms 53 of bellcranks 55 and pivotally connected to said lever arms by pivot pins 56. The bellcranks 55 extend between transverse bars 57 extending across the main frame 11 and welded or otherwise secured to the inner sides of the side frame structures 26. Pivot pins 59 serve to pivotally mount the bellcranks 55 between the transverse bars 57.

The bellcranks 55 also have laterally outwardly extending lever arms 60 having depending links 61 pivotally connected to their outer end portions, on pivot pins 63. The links 61 extend between longitudinally spaced ears 64, extending upwardly from the plates 45, and are pivotally connected between said ears as by pivot pins 65.

Thus, when the loader is travelling along the roadway and one wheel encounters a rock or an uneven portion on the roadway, this wheel and the associated end of the differential and axle housing 36 will be raised upwardly. This will cause the transverse equalizing bar 51 to depress the other end of the differential and axle housing 36 through the bellcranks 55 and thereby maintain the two wheels in engagement with the roadway and maintain a three point suspension for the frame 11 on the two front drive wheels 12 and along the transverse center of the differential and axle housing 36. The frame 11 will thus remain stabilized during the operation of loading regardless of the level of the mine or tunnel floor and the point of support of the main frame 11 on the rear differential and axle housing 36 will always be at the longitudinal center of the loader.

The means for steering the rear wheels includes steering arms 66 extending outwardly and rearwardly from annular supports 67 for the wheels 13 and their drive axles (not shown). The steering arms 66 are shown as having rearwardly extending arms 69 of a tie rod structure 70 pivotally connected thereto on pivot pins 72. The tie rod structure 70 includes transverse rods 71 welded or otherwise secured to the inner sides of the arms 69 and extending inwardly therefrom. As shown in FIGURES 4 and 5, the rods 71 have threaded inner end portions 73 having upright support arms 74 threaded thereon. The upright support arms 74 are slotted at their lower end portions, the slotted portions thereof opening to the internal threaded portions thereof. Nuts and bolts 75 extending through the lower end portions of the support arms 74 are provided to draw the support arms into tight engagement with the threaded portions 73 of the rods 71 and retain the support arms in an upright position. Suitable means (not shown) may be provided to lock the nuts and bolts 75 in position.

The upper end portions of the support arms 74 have opposite reduced end portions 77 of piston rods 79 extending therethrough and retained thereto as by pins 80. The piston rod 79 as shown in FIGURE 4 has a piston 81 formed integrally therewith intermediate the ends thereof and slidable along the inner cylindrical wall of a cylinder 83. The cylinder 83 is closed at its opposite ends by end caps 84, 84 suitably secured and sealed thereto and suitably sealed to the piston rod 79. Fluid pressure lines 85 enter the cylinder 83 adjacent opposite ends thereof to supply fluid under pressure to either side of the piston 81, as selected, for steering the loader.

The cylinder 83 is shown as having spaced arms 88 extending rearwardly therefrom in parallel relation with respect to each other and forming a guide slot slidably engaging opposite sides of a reaction block 89. The reaction block 89 is shown in FIGURE 6 as being disposed between the upper side of a transverse bar 90 and the underside of a plate 91, mounted at its ends on the transverse bar 90 on spacer plates 93, spacing the plate 91 above the bar 90 and connecting said plate thereto. A vertical pivot pin 94 extends through the plate 91, reaction block 89 and bar 90 and is welded or otherwise secured to said plate and bar to pivotally mount the reaction block 89 thereon. The transverse bar 90 has depending bracket members 95 extending forwardly from opposite ends thereof and abutting the upper surfaces of the plates 45 and bolted or otherwise secured thereto.

The reactions of steering are thus taken on the reaction block 89 which moves vertically and tilts with the differential and axle housing 36 and therefore moves and tilts the steering cylinder 83 with tilting movement of the differential and axle housing 36, as said differential and axle housing its tilted by the action of the wheels 13 travelling over rough and irregular ground.

The tie rod structure 70 thus includes steering cylinder 83 as a part thereof, which follows tilting and vertical movement of the differential and axle housing, and thereby avoids binding between the steering cylinder and the parts operated thereby during steering when the loader is travelling along rough or even ground.

Suitable steering control valves may be provided under the control of a steering wheel or the like, for supplying fluid under pressure to either end of the cylinders 83 as selected, by turning of the steering wheel in one direction or another to turn the wheels 13 in the desired direction for steering.

While I have herein shown and described one form in which my invention may be attained, it should be understood that various modifications and variations in the invention may be effected without departing from the spirit and scope of the novel concepts thereof, as defined by the claims appended hereto.

I claim as my invention:

1. In a rock loader, a frame, wheels supporting said frame and including two steering wheels, a transverse support structure angularly movable with respect to said frame in vertical directions about axes extending longitudinally of said frame and forming a support for said steering wheels at its opposite ends, a hydraulic cylinder having a piston therein, a piston rod extending from opposite ends of said cylinder and piston, an operative connection from said piston rod to said steering wheels for turning said steering wheels for steering, means retaining said cylinder to said transverse support structure and accommodating relative movement of said cylinder with respect to said transverse support structure comprising a block, a pair of parallel spaced arms extending from said cylinder toward said transverse support structure and slidably engaging opposite sides of said block, a transverse bar rigidly mounted on said transverse support structure and forming a support for said block and said arms, a plate spaced above said bar, block and arms and rigidly connected to said bar and retaining said arms for vertical movement with said block and said transverse support structure, and a pivot pin pivotally connecting said block to said bar and plate.

2. In a rock loader and the like, a frame, drive wheels and longitudinally spaced drive and steering wheels supporting said frame, a differential and axle housing supporting said frame on said drive wheels, a differential and axle housing having said steering and drive wheels supported on opposite ends thereof for turning movement for steering, a transversely extending equalizing bar, and operative connections from opposite ends of said equalizing bar to said differential and axle housing for said steering and drive wheels and supporting one end portion of said frame on said last mentioned differential and axle housing, a tie rod structure for turning said steering and drive wheels for steering and including a hydraulic steering cylinder and piston, a piston rod extending from opposite ends of said cylinder, tie rods connected with opposite ends of said piston rod and having operative connection with said steering wheels for turning said wheels for steering upon the admission of fluid under pressure to either end of said hydraulic steering cylinder, a movable reaction member mounted on said last mentioned differential and axle housing for movement therewith, comprising a block vertically pivoted to said last mentioned differential and axle housing, means extending from said cylinder and slidably engaging opposite sides of said block and retaining said cylinder from lateral movement with respect to said block and with respect to said last mentioned differential and axle housing, and other means retaining said cylinder for vertical movement with said block to effect angular and vertical movement of said steering cylinder in accordance with tilting movement of said last mentioned differential and axle housing relative to said frame.

References Cited in the file of this patent
UNITED STATES PATENTS

| | | |
|---|---|---|
| 1,098,816 | Marsh et al. | June 2, 1914 |
| 2,152,021 | Baumer | Mar. 28, 1939 |
| 2,536,769 | Rix et al. | Jan. 2, 1951 |
| 2,582,142 | Martin | Jan. 8, 1952 |
| 2,625,231 | Martin | Jan. 13, 1953 |
| 2,625,232 | Lado | Jan. 13, 1953 |
| 2,714,459 | Hay | Aug. 2, 1955 |
| 2,748,509 | Brown | June 5, 1956 |
| 2,855,065 | Lucien | Oct. 7, 1958 |
| 2,948,540 | Fabere | Aug. 9, 1960 |
| 3,016,987 | Williamson | Jan. 16, 1962 |

OTHER REFERENCES

Moving The Earth, Nichols, H. L., Copyrighted 1955.